Aug. 10, 1926. 1,595,266
W. E. TURNER
EGG CASE
Filed March 18, 1924 2 Sheets-Sheet 1
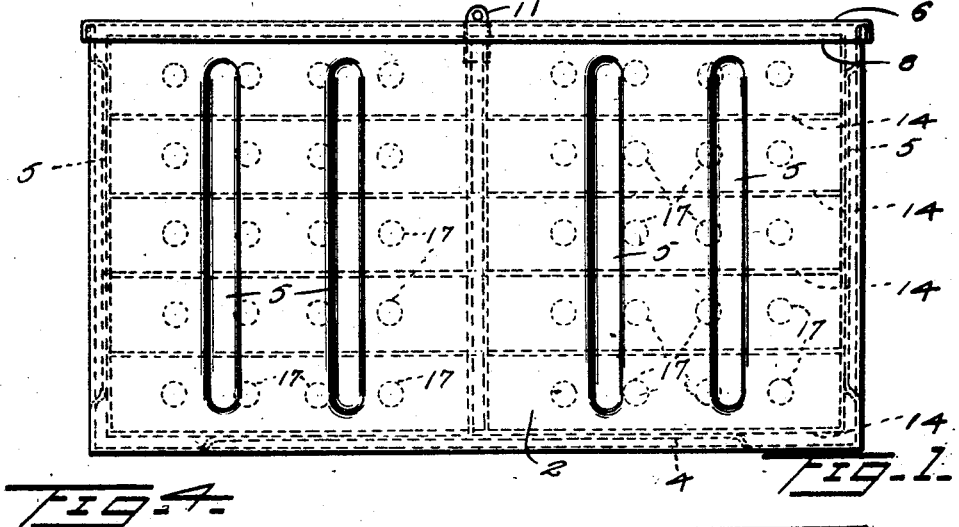
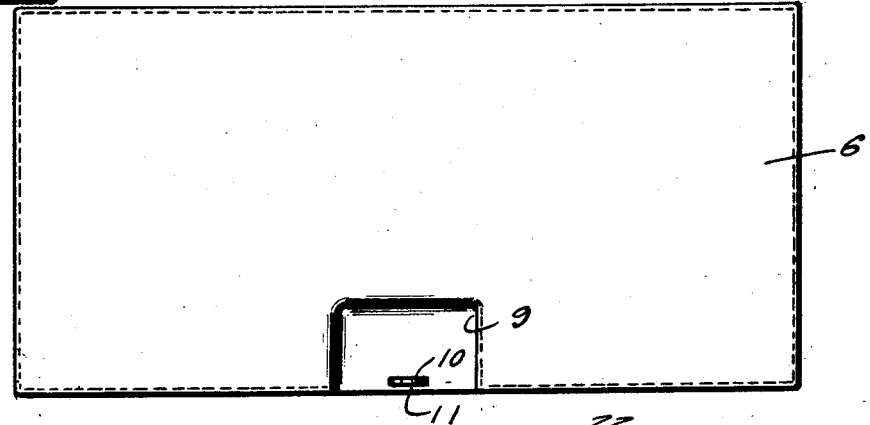
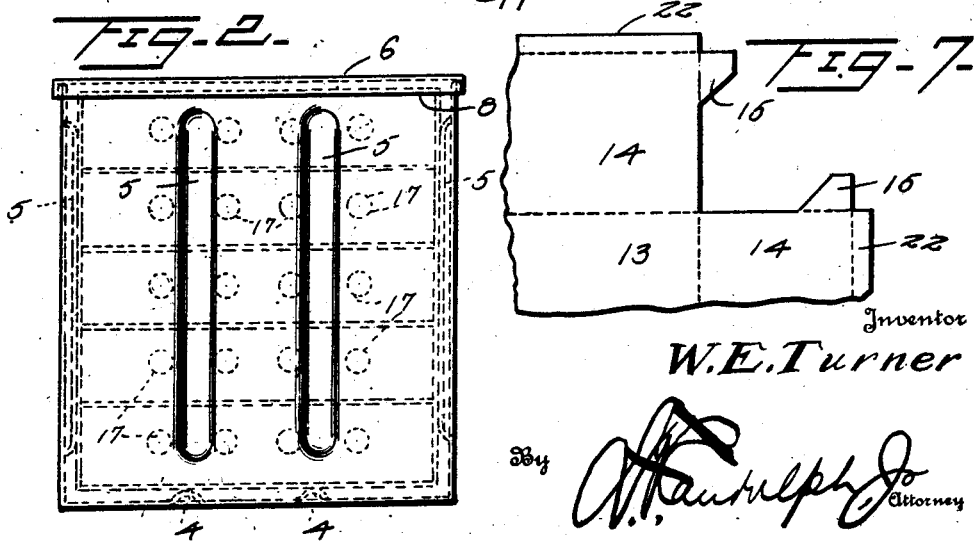
Inventor
W. E. Turner Aug. 10, 1926.
W. E. TURNER
EGG CASE
Filed March 18, 1924　　2 Sheets-Sheet 2
1,595,266
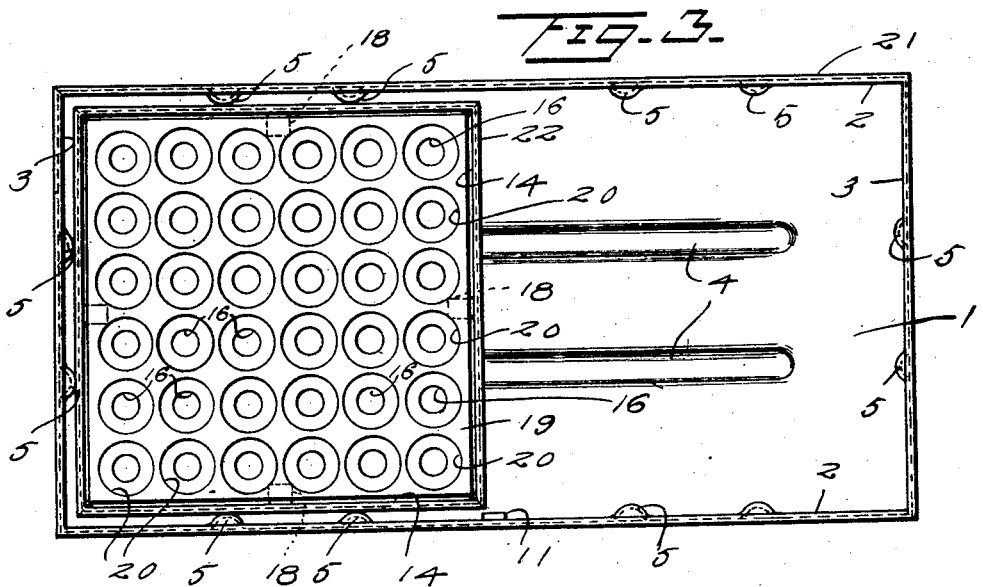
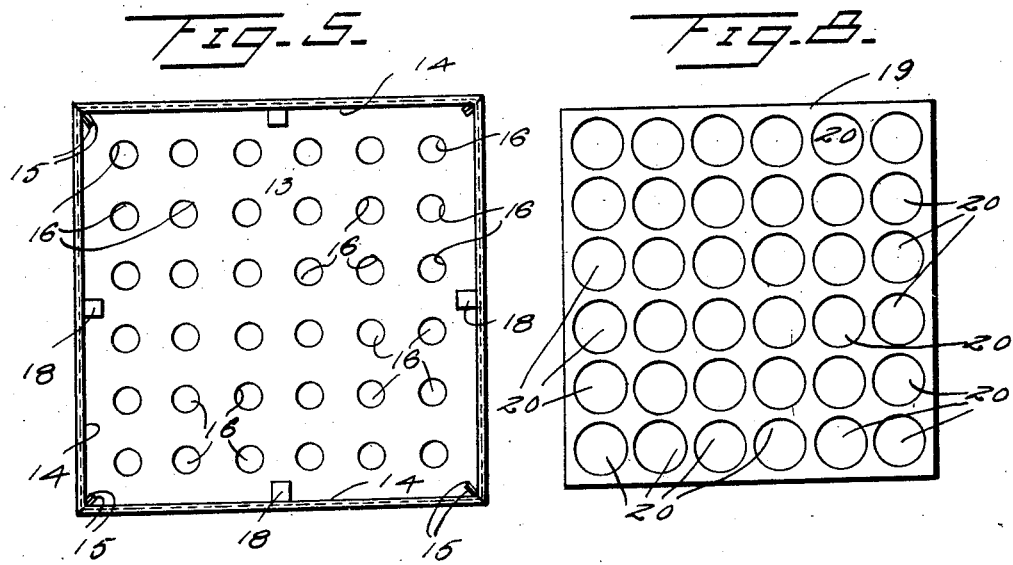
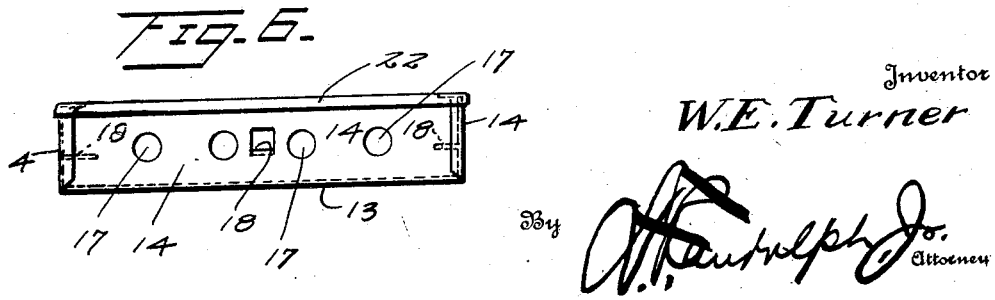
Inventor
W. E. Turner Patented Aug. 10, 1926.

1,595,266

UNITED STATES PATENT OFFICE.

WILLIAM E. TURNER, OF ROCHESTER, NEW YORK.

EGG CASE.

Application filed March 18, 1924. Serial No. 700,080.

The invention relates to egg cases or crates for shipping and storing eggs.

In common practice the egg cases now used for shipping and storing eggs are usually of wood with fiber fillers for holding the eggs and cardboard flats dividing the fillers into compartments. The disadvantage of these cases is that where eggs are stored for any time, the fiber fillers and cardboard flats absorb moisture from eggs that may have been broken in shipment or storage, and as egg shells are porous and absorb the foul odors that may be given off from the saturated fillers and flats the quality of the eggs in storage is depreciated and the commercial value thereof reduced.

This invention is intended to overcome this objection of the egg case now commonly used by providing a case and egg-holding sections made entirely of metal thereby dispensing with the disadvantage of the absorbent qualities of the wood and fiber fillers and flats, making an absolutely sanitary egg container.

Furthermore, the utilization of metal in the manufacture of articles of this character reduces the dimensions of each individual egg case making it possible to store approximately fifteen per cent more eggs in the same storage space.

The construction and advantages of the invention will be described hereinafter and will be found illustrated in the accompanying drawings, in which:

Figure 1 is a side elevation of the improved egg case,

Figure 2 is an end view,

Figure 3 a top plan view of the interior of the case showing the egg trays removed from one end of the case, Figure 4 a top plan view of the case with the cover in position, Figure 5 a top plan view of one of the egg trays, Figure 6 an end view, Figure 7 a detail of one corner of the blank from which the tray is constructed, and Figure 8 a top plan view of one of the fillers.

In the drawings similar reference characters will be used to designate corresponding parts throughout the several views.

The body of the egg case consists of a bottom 1, front and rear sides 2 and ends 3, it being understood that the parts 1, 2 and 3 are cut out of a single sheet of metal and bent to form the body of the case, the meeting edges of the front and rear sides and the ends being secured together in any suitable manner such as overlapping joint, welding, etc.

The bottom section 1 has upwardly pressed reinforcing ribs formed therein, indicated at 4, said ribs extending longitudinally of the bottom, and the front and rear sides 2 and the ends 3 also formed with inwardly extending reinforcing vertical ribs 5. Ribs 4 and 5 also have the function of supporting the egg trays, to be hereinafter described, away from the flat portion of the bottom and sides and ends to form ventilating spaces, and also to cushion the trays.

The cover is hingedly mounted on the rear side 2 and provided with downwardly projecting flanges on its front and ends as shown at 8, the meeting edges of the flanges on the front and ends being welded or otherwise secured together. 9 indicates a depression formed in the cover at its front edge that is designed to hold a card or label bearing information regarding the contents of the case such for instance as the date of packing the eggs, and of storing them, the name of the shipper, or owner of the eggs, etc. 10 indicates a longitudinal slot in the cover to receive a lug 11, welded or otherwise secured to the inside of the front side 2, said lug having an opening therein to receive a suitable locking member not shown.

The egg trays are also constructed of a single piece of sheet metal, the bottom of the tray being indicated at 13 while the sides and ends are designated 14, the meeting edges of the sides being secured together in any suitable manner such as an overlapping joint, welding, etc. In Figure 7 is shown the detail of the corner of the blank from which the tray is formed. When cutting out the corner of the blank to form the edges of the sides, a lug 15 is left adjacent to the outer edge of each side, and these lugs in forming the tray are bent inwardly and secured together and form a rest for the tray to be superposed thereon in packing the trays in the body of the case.

The bottom 14 is provided with a plurality of holes 16, and the sides are also provided with openings 17, the openings in the bottom being positioned to seat the eggs, and also acting with holes 17 as ventilating openings for the trays. 18 indicates tongues cut out of sides 14 and bent inwardly to form rests for the fillers illustrated in Figure 8. The filler is a single sheet of metal 19 and provided with a plurality of openings 20 into which the eggs are inserted.

The upper edges of the sides and ends of the body portion of the box and also of the sides of the tray are reinforced by bending the upper edges back on themselves and pressing such bent back portions close against the sides as shown at 21 and 22 in Figure 3.

The structure of the trays with the boxes perforated and the filler with openings therein alining with the perforations in the trays permits candling the eggs while in the trays, as it will be apparent that by passing the tray containing the eggs over a strong light that all of the eggs in the tray may be seen simultaneously.

What is claimed is:

In an egg case, the trays formed of sheet metal having perforated bottoms and sides, inwardly extending lugs at the upper edges of the corners of the sides, and inwardly extending projections intermediate of the ends of the sides and of the upper and lower edges thereof, said projections being formed by cutting out tongues and bending them inwardly at an angle to the sides, and a flat filler adapted to seat on said projections and having openings therein in alinement with the openings in the bottom.

In testimony whereof I affix my signature.

WILLIAM E. TURNER.